United States Patent
Eisenbach et al.

(10) Patent No.: US 7,784,161 B2
(45) Date of Patent: Aug. 31, 2010

(54) DEVICE FOR MACHINING THE CORNER AREA OF A FRAME WELDED TOGETHER OUT OF PROFILED PIECES

(75) Inventors: Bernd Eisenbach, Brechen (DE); Peter Zimmer, Grenderich (DE)

(73) Assignee: ROTOX GmbH, Grenderich (DE)

( * ) Notice: Subject to any disclaimer, the term of this patent is extended or adjusted under 35 U.S.C. 154(b) by 826 days.

(21) Appl. No.: 11/691,604

(22) Filed: Mar. 27, 2007

(65) Prior Publication Data
US 2007/0234550 A1  Oct. 11, 2007

(30) Foreign Application Priority Data
Mar. 27, 2006 (DE) .................. 10 2006 014 405

(51) Int. Cl.
*B23P 23/02* (2006.01)
*B23C 3/12* (2006.01)
(52) U.S. Cl. ............... 29/26 A; 29/30; 29/33 A; 29/55; 409/140; 409/192; 408/25; 408/46
(58) Field of Classification Search ........ 29/26 R, 29/26 A, 30, 50, 54, 55, 56.5, 33 A, 564, 29/565, 35.5; 409/192, 203, 213, 217, 138, 409/139, 140; 408/24–25, 46, 43, 42; *B23C 3/12*
See application file for complete search history.

(56) References Cited

U.S. PATENT DOCUMENTS

| | | | |
|---|---|---|---|
| 4,521,567 A | | 6/1985 | Arndt et al. |
| 4,543,020 A | * | 9/1985 | Shtipelman ............ 29/26 R |
| 5,125,495 A | * | 6/1992 | Ganzberger et al. ...... 198/345.1 |
| 5,298,844 A | * | 3/1994 | Nagasaki et al. ............ 29/26 A |

(Continued)

FOREIGN PATENT DOCUMENTS

DE      3321098 A1 *  1/1985

(Continued)

OTHER PUBLICATIONS

Machine translation of JP-07-124848-A, which JP '848 was published in May 1995.*

*Primary Examiner*—Erica E Cadugan
(74) *Attorney, Agent, or Firm*—Connolly Bove Lodge & Hutz LLP

(57) ABSTRACT

This invention relates to a device for machining the corner area (1) of frames welded together out of profiled pieces (2, 3) such as, for instance, window or door frames, comprising at least one machining tool (4, 5, 6) that can be moved by means of a tool carrier (7) into the appropriate machining position at the corner area (1) of the frame along an axis (y) extending diagonally to the frame corner (3) and along an axis (z) perpendicular thereto. In order to allow machining of the corner area of a window or door frame as well as machining of the profile section itself, it is proposed according to the invention that the tool carrier (7) can move another tool carrier (8) arranged laterally thereto for at least one machining tool (9) configured for machining the profile section (2, 3), whereby the second tool carrier can be moved at least along an axis (x) extending at an angle α relative to the axis (y) in the diagonal direction of the frame corner (1).

14 Claims, 2 Drawing Sheets

U.S. PATENT DOCUMENTS

| | | | | |
|---|---|---|---|---|
| 5,448,819 | A | * | 9/1995 | Grassi ........................ 29/33 A |
| 5,943,750 | A | * | 8/1999 | Koren et al. ................. 29/26 A |
| 6,067,695 | A | * | 5/2000 | Momoitio ................... 29/26 A |
| 7,171,735 | B2 | * | 2/2007 | Okafuji et al. ............... 29/33 A |
| 2005/0141974 | A1 | * | 6/2005 | Jaegg ......................... 409/138 |
| 2005/0161117 | A1 | * | 7/2005 | Jagg ........................... 144/360 |

FOREIGN PATENT DOCUMENTS

| | | | |
|---|---|---|---|
| DE | 3329765 | A1 | 2/1985 |
| DE | 4109749 | A1 * | 10/1991 |
| DE | 4018145 | A1 * | 12/1991 |
| DE | 4219088 | A1 * | 12/1993 |
| DE | 10027985 | A1 * | 1/2002 |
| DE | 10212210 | A1 | 10/2003 |
| DE | 10300309 | A1 | 7/2004 |
| DE | 102006007171 | A1 * | 8/2007 |
| EP | 0460654 | A1 | 12/1991 |
| EP | 618032 | A1 * | 10/1994 |
| EP | 1199146 | A2 * | 4/2002 |
| EP | 1215002 | A2 * | 6/2002 |
| EP | 1221354 | A1 * | 7/2002 |
| EP | 1570934 | A3 * | 9/2005 |
| JP | 07-124848 | A * | 5/1995 |
| SU | 889299 | B * | 12/1981 |

\* cited by examiner

DEVICE FOR MACHINING THE CORNER AREA OF A FRAME WELDED TOGETHER OUT OF PROFILED PIECES

RELATED APPLICATIONS

This application is claims the benefit of German application No. 10 2006 014 405.8, filed Mar. 27, 2006.

FIELD OF THE INVENTION

The invention relates to a device for machining the corner area of a frame welded together out of profiled pieces such as, for instance, window or door frames, said device comprising at least one machining tool that can be moved by means of a tool carrier into the appropriate machining position at the corner area of the frame along an axis diagonal to the frame corner and along an axis perpendicular thereto.

STATE OF THE ART

Such devices for frames welded together out of plastic profiles such as, for example, window frames or door frames, serve to remove the weld beads that protrude outwards and that are formed on the welding seams when the plastic profiles are welded and, if applicable, said devices serve to expose sealing grooves or similar contours.

Such a finishing device is disclosed, for example, in German patent specification DE 33 29 765 or in European patent application EP 0 460 654 A1. Here, the frames are held in a clamping device, whereby a support carrying several machining tools can be moved diagonally to the frame and along an axis perpendicular to the plane of the frame. The corner joints are machined by means of milling tools, lathing tools or, for instance, drilling tools.

When it comes to window or door frames, it is sometimes necessary to create bores and profiled through holes on the profile sections of the frame, for instance, in order to accommodate locks and hardware for the window and door frames. This is normally done on so-called rod-machining devices of the type known, for example, from German patent applications DE 102 12 210 A1 or DE 103 00 309 A1. Here, the profiled pieces are machined before they are joined or welded together to form the frame. Up until now, creating bores or through holes in the frame sections had to be done in two machining operations on different devices.

SUMMARY OF THE INVENTION

Before this background, the invention is based on the objective of refining a device of the above-mentioned type in such a way that the corner joints of the frame and the frame sections can be machined, for example, in order to create profiled through holes, bores and the like, while achieving a simple structural design and reliable operation.

This objective is achieved by a device having the features of the present invention.

The device according to the invention for machining the corner area of a frame welded together out of profiled pieces such as, for instance, window or door frames, comprises at least one machining tool that can be moved by means of a tool carrier into the appropriate machining position at the corner area of the frame along at least one axis extending parallel to the plane of the frame, preferably diagonally to the frame, and along an axis perpendicular thereto. In this context, the tool carrier can move another tool carrier arranged laterally thereto for at least one machining tool configured for machining the profile section, whereby the second tool carrier can be moved along another axis extending at an angle α in the diagonal direction of the frame corner.

The term movability of the tool carrier along an axis extending parallel to the clamping plane of the frame refers to the movability along only one axis (Y) and/or the movability along another axis (X) extending in the clamping plane. Consequently, the tool carrier can be moved along one axis or else along both axes that encompass the plane of the frame.

The invention permits machining the corner of the frame as well as machining a profile section with one single device and in one single clamping position of the frame. In this context, it is particularly advantageous that the fact that the machining tools can be moved or driven can also be utilized for machining the profile sections. Here, in order to bring the at least one machining tool into the appropriate machining position for the profile section, the second tool carrier is configured so that it can be moved at least along an axis that extends at an angle α relative to the diagonal direction of the frame. As a result, the machining tool can be moved along the profile section and can be brought into the appropriate machining position. In order to machine the four corner areas as well as each one of the profile sections that are adjacent to each frame corner, the frame is turned every time.

Fundamentally, however, it is of course conceivable for such tool carriers to be arranged on both sides of the first tool carrier.

On the basis of an advantageous embodiment of the device according to the invention, it is proposed that the at least one tool carrier can be moved along the diagonals of the frame that is to be machined. Here, the tool carrier itself can be configured such that it can be moved in at least one of the spatial directions defined by the clamping plane.

Preferably, the tool carrier can be moved along both diagonals of a frame that is to be machined. Relative to a frame corner, the tool carrier can also be moved along an axis formed by a miter of two profiled pieces that typically converge at a right angle. In addition, movability perpendicular to such a miter or to a frame diagonal is also proposed, so that the tool carrier can reach any position in the plane encompassed by the frame.

Thus, the movability of the at least one tool carrier in all spatial directions X, Y and Z provides a maximum number of movement and adjustment possibilities, as a result of which the device can be individually adapted to any desired dimensions of the profiled pieces.

Particularly in the case of square or rectangular frames, it is recommended for the additional axis of movement of the second tool carrier to be at an angle of about 45° relative to the axis in the diagonal direction of the frame since this allows an exact movement of the machining tool in the lengthwise direction of the profiled piece.

In order to ensure precise machining with the machining tool for the profile section, the additional axis of movement of the second machining tool or of the tool carrier should extend parallel to the clamping plane of the frame.

Thus, it is especially proposed that the angle between the additional axis of movement of the additional machining tool and the two axes of movement of the tool carrier extending in the frame planes should be about 45° or about 135° in the direction of the frame diagonals.

In order to prevent a collision between the frame and the at least one machining tool for the profile section during the use of the machining tools provided for the corner area of the frame, it is proposed according to the invention for the second tool carrier and/or the machining tool for the profile section to be movable from a retracted initial position into a machining position on the profile section.

Here, it is recommended for the at least one machining tool for the profile section to be movable in the direction of its tool axis from a retracted initial position into a machining position on the profile section. In this manner, it is ensured in a particularly simple manner that the at least one machining tool for the profile section does not collide with the frame when the machining tools for the corner area are being used.

Especially for purposes of creating so-called water channels in the profile sections that serve to allow splashed water, condensation water and the like to flow out of the frame, it is proposed according to the invention for the angle of the tool axis of the least one machining tool for machining the profile section to be adjustable relative to the clamping plane of the frame.

According to the invention, it is also possible for the at least one machining tool to be configured for machining the outside, top and/or bottom of the profile section, which can also be done, for example, in that the angle of the tool axis of the least one machining tool for the profile section is adjustable.

It likewise falls within the scope of the invention that the second tool carrier with the machining tool for the profile section can be uncoupled from the first tool carrier. This lends itself particularly well when there is no need to machine the profile sections. In such a case, the second tool carrier is uncoupled from the first tool carrier that carries the machining tool for the corner area. As a result, such a frame can be machined more quickly since, when the machining tools are moved into position at the frame corner and when the machining tools are moved away from the frame, the weight that has to be accelerated and decelerated is reduced because the second tool carrier has been eliminated.

In this context, it can already be sufficient that the second tool carrier can be uncoupled from the first tool carrier in just one direction of movement perpendicular to the clamping plane of the frame.

From a design standpoint, it is particularly advantageous for the second tool carrier to be connected to the first tool carrier via an arm, as a result of which the requisite lateral distance between the first and the second tool carriers is established in the clamping plane of the frame.

Here, it can be advisable for the second tool carrier or its arm to be held on the first tool carrier, which is configured as a support. In a simple manner, such a support allows the tool carrier to be moved in the diagonal direction of the frame or along the miter of the frame corner and perpendicular thereto or perpendicular to the clamping plane of the frame, for example, by means of a swivel slide.

The movability of the second tool carrier, especially in the direction parallel to the frame section, can be easily achieved according to the invention by means of a spindle drive that allows the requisite machining position of the machining tool on the frame section to be reached with precision.

In contrast, a pneumatic drive is advantageous for effectuating the advance motion of the machining tool for the profile sections from the initial position into the machining position.

Additional objectives, advantages, features and application possibilities of the present invention can be gleaned from the description that follows of an embodiment making reference to the drawings. Here, all of the described and/or depicted features by themselves or in any feasible combination constitute the subject matter of the present invention, also independently of their compilation in the claims or in the way they relate back to the main claim. The following is shown:

DESCRIPTION OF THE DRAWINGS

FIG. 1 shows a perspective view of the device according to the invention for machining the corner area of window or door frames that allows a profile section to be machined while the frame is in the same clamping position.

Figure 1:
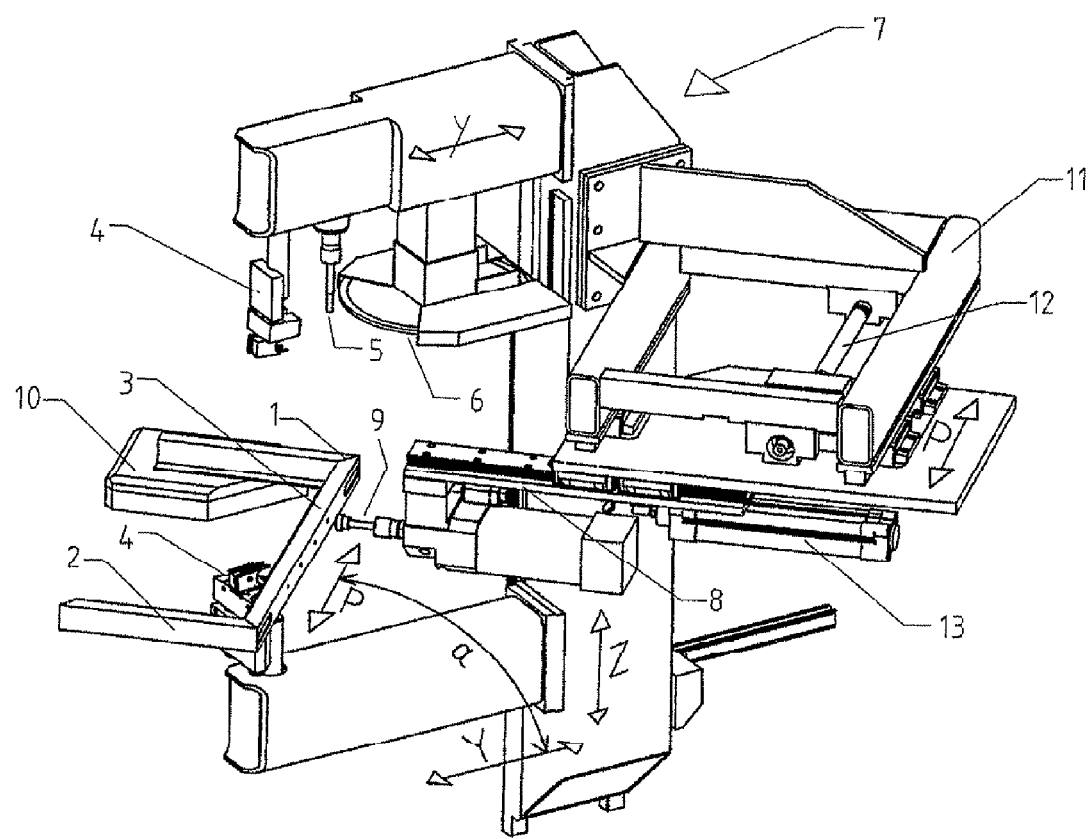
FIG. 1: a perspective view of the device according to the invention.

The device has a holder (not shown in further detail) on which the frame to be machined, for instance, a window or door frame, rests. The frame consists of plastic profiles or frame sections 2, 3 that have been previously mitered and that are then welded at the corners. The welding seam to be machined runs at an angle of 45° relative to the adjacent frame sections 2, 3 that are joined together. In the view chosen here, only one frame corner with frame sections 2, 3 can be seen.

The corner joints are machined by means of milling tools, lathing tools or, for instance, drilling tools 4, 5, 6. In order to bring the machining tools 4, 5, 6 into the machining position at the corner area 1 of the frame, these machining tools 4, 5, 6 have to be movable horizontally or parallel with respect to the clamping plane 10 of the frame in the y-direction and in a direction z perpendicular to the clamping plane 10.

For this purpose, a support 7 is provided in a machine stand and this support 7 can be slid in the vertical (z-direction) and horizontal (x-direction) directions, and in the diagonal direction of the frame (y-direction), whereby this support 7 is moved by means of linear actuators (likewise not shown) such as stepping motors or spindle motors or, for example, pressure-actuated piston-cylinder units. The support is essentially U-shaped and has machining tools 4, 5, 6 arranged on each leg of the support 7 for machining the top and bottom of the clamped frame corner.

In the embodiment chosen here, the lower leg of the tool carrier 7 has a lathing blade 4 for removing the weld beads that have formed in the corner area on the bottom of the clamped frame. The upper leg of the tool carrier 7 likewise has a lathing blade 4 as well as a drill 5 to create a sealing groove and a side milling cutter 6 to remove the weld beads from the outer corner of the frame.

Naturally, it is also possible to provide additional or different machining units on the tool carrier 7.

In order to machine the profile section 2 or 3, for instance, in order to create bores in the outside of the profile section 3, which are shown in the figure as dots on the profile section 3, or for example, to create slots in the profile sections 2 or 3, an additional machining tool 9 is provided which is hold on another tool carrier 8. This additional tool carrier 8 is located to the side of the tool carrier 7 as seen in the clamping plane 10 of the frame and it can be moved together with the tool carrier 7 in the diagonal direction y and in the vertical direction z.

In order to avoid a collision of the machining tool 9 with the frame during the machining of its corner area, in other words, when the machining tools 4 to 6 are being used, the machining tool 9 is moved into a retracted initial position by means of a pneumatic drive 13.

In order for the second tool carrier 8 to be able to reach the individual machining positions along the profile section 3, it can be moved in the clamping plane 10 of the frame at an angle α relative to the direction of movement y of the first tool carrier 7. This angle α corresponds to the angle bisector of the specific frame corner that is to be machined and is α=45° in the present case. To create this movability in the p-direction, the embodiment chosen here has a spindle drive 12 that slides the tool carrier 8 arranged on the support 7.

The connection and the lateral spacing in the frame plane 10 between the first tool carrier 7 and the second tool carrier 8 are effectuated by means of an arm 11 in the embodiment chosen here.

The device shown allows machining of the corner area of a frame as well as machining of a profile section in different machining positions on the profile section. By turning the frame by 90° each time, the four corner areas and, if applicable, the adjacent profile section in each case can be machined one after the other.

Figure 2:
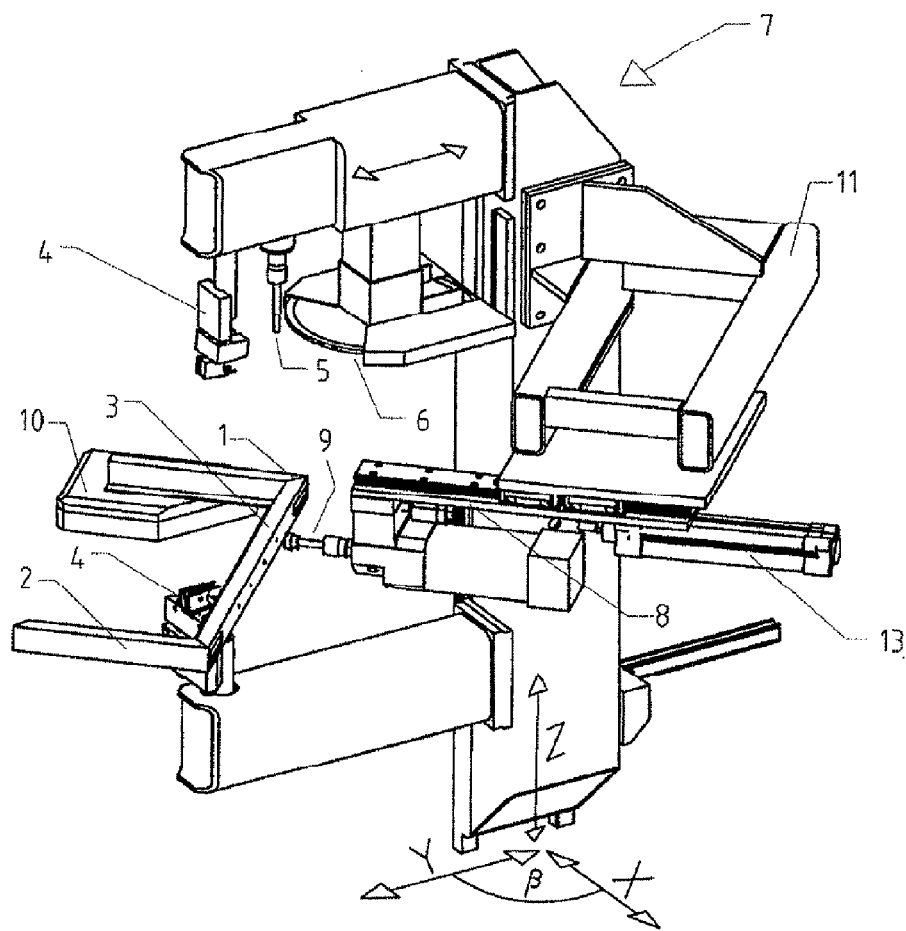
FIG. 2: another perspective view of the device with a tool carrier that can be moved in three spatial directions (x, y, z).

As a complement to the view according to FIG. 1, FIG. 2 shows another embodiment of the device according to the invention in which the tool carrier 7 is configured so that it can be moved along a third spatial direction (X). This third direction is essentially defined by the vector product of the axis (Z) with the direction vector of the axis (Y). Like direction (Y), it also lies parallel to the plane that is encompassed by the frame. The two axes of movement or directions (X) and (Y) extend essentially perpendicular to each other and can be oriented parallel to the appertaining frame diagonals.

The angle β between the axis (Y) and the axis (X) essentially amounts to 90°. Therefore, the angle between the additional movement axis (P) and the axis (X) essentially amounts to 135°.

In this context, the movement axis (X) extends essentially in the direction of a miter formed between the profiled pieces 2 and 3, in other words, diagonal to the frame corner and perpendicular to the axis (Y) The movability of the entire tool carrier in all three spatial directions (X, Y, Z) translates into a great deal of flexibility and allows an uncomplicated and fast adaptation of the device to all kinds of dimensions of the profiled pieces.

Even though the embodiments shown each depict a pair of tool carriers coupled to each other, the invention can also equally be employed with so-called dual-head machining devices in which frame corners at a distance from each other can be machined simultaneously. Accordingly, such dual-head devices have several such tool carriers 7 according to the invention.

LIST OF REFERENCE NUMERALS

1 corner area
2 profiled piece, profile section
3 profiled piece, profile section
4 machining tool
5 machining tool
6 machining tool
7 first tool carrier, support
8 second tool carrier
9 machining tool
10 clamping plane
11 arm
12 spindle drive
13 pneumatic drive

The invention claimed is:

1. A device for machining a corner area of a frame welded together out of profiled pieces, comprising at least one machining tool that can be moved by means of a first tool carrier into an appropriate machining position at the corner area of the frame, which first tool carrier is guided along at least one linear axis (X or Y) extending parallel to a horizontal clamping plane of the frame, and which first tool carrier is guided along a linear axis (Z) perpendicular thereto, wherein a second tool carrier having at least one further machining tool configured for machining one of the profiled pieces is attached to the first tool carrier via an arm extending from the first tool carrier such that the second tool carrier is laterally spaced with respect to the first tool carrier, wherein the first tool carrier can move the second tool carrier, and wherein the second tool carrier can be moved via a drive along at least another horizontal linear axis (p) extending at an angle (α) of about 45 degrees relative to the at least one axis along which the first tool carrier is guided, which at least one axis (y or x) extends in a diagonal direction of the frame.

2. The device according to claim 1, wherein the at least one axis comprises two axes (y, x) that extend diagonally relative to the frame.

3. The device according to claim 1, wherein the perpendicular axis extends vertically.

4. The device according to claim 1, wherein the angle (α) between the at least another axis of movement (p) of the second tool carrier and the at least one axis (y) in the diagonal direction of the frame is equal to 45°.

5. The device according to claim 1, wherein the at least another axis of movement (p) of the second tool carrier extends parallel to the clamping plane of the frame.

6. The device according to claim 1, wherein the second tool carrier and/or the at least one further machining tool for machining the one of the profiled pieces can be moved from a retracted initial position into a machining position for machining the one of the profiled pieces.

7. The device according to claim 1, wherein the at least one further machining tool has a longitudinal axis and can be moved in the direction of its tool longitudinal axis from a retracted initial position into a machining position for machining the one of the profiled pieces.

8. The device according to claim 1, wherein the at least one further machining tool is configured for machining the outside, top and/or bottom of the one of the profiled pieces.

9. The device according to claim 1, wherein the second tool carrier can be uncoupled from the first tool carrier.

10. The device according to claim 1, wherein, relative to the direction of movement (z) of the first tool carrier running perpendicular to the clamping plane of the frame, the second tool carrier can be uncoupled from the first tool carrier.

11. The device according to claim 1, wherein the drive for driving the second tool carrier is connected to the arm.

12. The device according to claim 1, wherein the second tool carrier or the arm is held on the first tool carrier, which first tool carrier is configured as a support.

13. The device according to claim 1, wherein the drive for moving the second tool carrier is a spindle drive.

14. The device according to claim 1, further comprising a pneumatic drive for effectuating an advance motion of the at least one further machining tool from an initial position into a machining position.

* * * * *

UNITED STATES PATENT AND TRADEMARK OFFICE
CERTIFICATE OF CORRECTION

PATENT NO. : 7,784,161 B2  Page 1 of 1
APPLICATION NO. : 11/691604
DATED : August 31, 2010
INVENTOR(S) : Bernhard Eisenbach et al.

It is certified that error appears in the above-identified patent and that said Letters Patent is hereby corrected as shown below:

On the cover page:

(30) Foreign Application Priority Data should read --March 27, 2006 (DE) 10 2006 014 405.8--, not "10 2006 014 405."

Signed and Sealed this

Ninth Day of November, 2010

David J. Kappos
*Director of the United States Patent and Trademark Office*